(12) United States Patent
Scriven et al.

(10) Patent No.: US 12,122,609 B2
(45) Date of Patent: Oct. 22, 2024

(54) METHOD AND APPARATUS FOR INFEED OF ACCUMULATOR

(71) Applicant: Paper Converting Machine Company, Green Bay, WI (US)

(72) Inventors: Elijah Scriven, Sobieski, WI (US); Jonathon Zahn, Green Bay, WI (US)

(73) Assignee: BW Converting, Inc., Green Bay, WI (US)

( * ) Notice: Subject to any disclaimer, the term of this patent is extended or adjusted under 35 U.S.C. 154(b) by 190 days.

(21) Appl. No.: 17/944,688

(22) Filed: Sep. 14, 2022

(65) Prior Publication Data

US 2023/0105240 A1   Apr. 6, 2023

Related U.S. Application Data

(60) Provisional application No. 63/261,981, filed on Oct. 1, 2021.

(51) Int. Cl.
*B65G 47/26*  (2006.01)
*B65G 17/12*  (2006.01)
*B65G 43/08*  (2006.01)

(52) U.S. Cl.
CPC .......... *B65G 43/08* (2013.01); *B65G 17/126* (2013.01); *B65G 47/261* (2013.01); *B65G 2201/0232* (2013.01); *B65G 2203/025* (2013.01); *B65G 2203/0283* (2013.01); *B65G 2203/042* (2013.01)

(58) Field of Classification Search
CPC .... B65G 43/08; B65G 17/126; B65G 47/261; B65G 2201/232; B65G 2203/025; B65G 2203/0283; B65G 2203/042

USPC ....................................................... 198/460.1
See application file for complete search history.

(56) References Cited

U.S. PATENT DOCUMENTS

| | | | |
|---|---|---|---|
| 4,142,626 A | 3/1979 | Bradley | |
| 4,168,776 A | 9/1979 | Hoeboer | |
| 6,053,304 A * | 4/2000 | Biagiotti | B65G 47/5122 198/794 |
| 6,840,368 B2 | 1/2005 | Betti et al. | |
| 7,104,494 B2 | 9/2006 | Casella et al. | |
| 8,490,772 B2 * | 7/2013 | Michler | B65G 47/5122 198/347.1 |
| 9,132,962 B2 * | 9/2015 | Cicalini | B65G 17/126 |
| 9,988,229 B2 | 6/2018 | Perini | |
| 10,829,328 B2 | 11/2020 | Perini | |
| 2002/0117030 A1 | 8/2002 | Gambaro et al. | |

(Continued)

*Primary Examiner* — Gene O Crawford
*Assistant Examiner* — Lester Rushin, III
(74) *Attorney, Agent, or Firm* — Thompson Coburn LLP

(57) ABSTRACT

An accumulator has a control system for controlling motion of a plurality of buckets on a continuous loop and logs traversing on a log transfer device. The log transfer device delivers a log from an entrance of the log transfer device to a bucket infeed on the accumulator. The bucket infeed receives a log from the log transfer device and allows a bucket to receive the log from the log transfer device. A time for the log to move from the entrance of the log transfer device to the bucket infeed is determined. Based on the time for the log to move from the entrance of the log transfer device to the bucket infeed, the control system controls the accumulator drive to move the continuous loop such that a bucket in the plurality of buckets is positioned at the bucket infeed with sufficient time to allow the bucket to receive the log from the log transfer device.

22 Claims, 8 Drawing Sheets

(56) References Cited

U.S. PATENT DOCUMENTS

| | | | |
|---|---|---|---|
| 2012/0163944 A1* | 6/2012 | Michler | B65G 47/5122 |
| | | | 414/800 |
| 2012/0308348 A1 | 12/2012 | Gelli et al. | |
| 2013/0333183 A1 | 12/2013 | Mazzaccherini et al. | |
| 2014/0151192 A1 | 6/2014 | Cicalini et al. | |
| 2021/0003998 A1* | 1/2021 | Delgado Arana | ............................ |
| | | | G05B 19/41865 |
| 2021/0039908 A1 | 2/2021 | Bertolucci et al. | |
| 2021/0047140 A1* | 2/2021 | Gussert | B65H 19/30 |
| 2021/0403266 A1 | 12/2021 | Techlin et al. | |

* cited by examiner

Calculate Arrival Time of Log
to Infeed from Tail Seal Unit

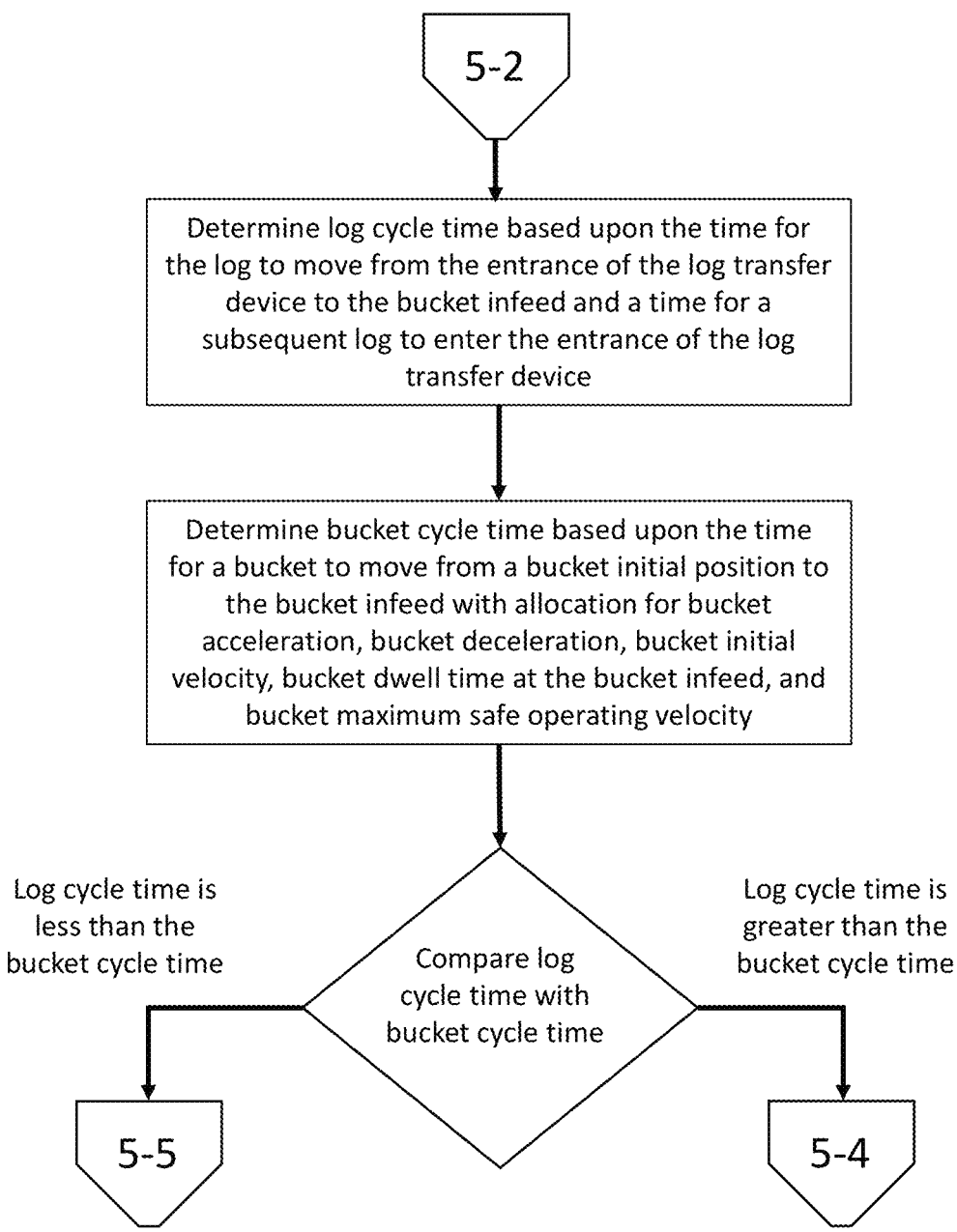

Intermittent Operation

Continuous Operation

METHOD AND APPARATUS FOR INFEED OF ACCUMULATOR

RELATED APPLICATION DATA

This application claims priority to application Ser. No. 63/261,981, filed Oct. 1, 2021, the disclosure of which is incorporated by reference herein.

BACKGROUND

The disclosure is directed to an accumulator for a processing line. More in particular, the accumulator is configured to transfer logs of convolutely wound web material between upstream and downstream sections of a processing line. The processing line upstream equipment may include a winding machine and tail seal unit which work together to wind the web material into logs upstream of the accumulator. The processing line downstream equipment may include a saw for cutting logs into rolls for consumer end use downstream of the accumulator. The accumulator allows for receiving logs from the winding equipment, storing the logs, and then transferring the logs in a desired timing and sequence as needed by the saw operations. The accumulator may also be used to receive, store and timely deliver the logs to other equipment.

In a conventional accumulator, the infeed of the accumulator comprises a "butterfly" or 4-station paddle device that momentarily stops each log, then rotates to meter the log into the accumulator. There are two drawbacks with these devices. First, logs often bounce when they reach the paddle and time is needed to allow the log to settle before actuating the paddle to transfer the log to the accumulator. This phenomenon reduces the maximum cycle rate. Second, at high cycle rates, the paddle may need to rotate at a relatively high speed which imparts an undesirable high vertical component of velocity to the log as the log it transferred to the accumulator. This may cause damage to the log and/or jams at the accumulator infeed.

The discussion that follows presents a log transfer device and an infeed for an accumulator, a method directed to transferring logs from a log transfer device to an accumulator, and a control system of a log transfer device and an accumulator, all of which overcome these issues.

SUMMARY

As shown in the drawings and the description that follows, the exemplary infeed comprises three basic components. First, a log transfer device is provided between the upstream machine and the accumulator, which allows the log to continue to roll in the same direction the log is already rolling when the log exits the upstream machine, for instance, a tail seal unit of a rewinding machine. Second, an array of sensors is provided relative to the log transfer device to detect the log at various positions as the log travels on the log transfer device. In one embodiment, three sensors are provided: the first at the entrance to the log transfer device, a second at position toward the mid-point of travel of the log on the log transfer device, and a third at an exit of the log transfer device just prior to a bucket infeed of the accumulator. Data from these sensors is used to estimate the rolling log's velocity and acceleration, and to predict when the log will arrive at the bucket infeed of the accumulator. Third, cushioning elements are provided at or adjacent to the bucket infeed of the accumulator to assist in dissipating the energy of the rolling log thereby reducing unwanted log motion at the bucket infeed and ensuring a more reliable transfer of the log to a bucket at the bucket infeed of the accumulator.

In one aspect of the method, the positions of the log on the log transfer device are determined through extrapolation based upon the times at which the log passes by the sensors arranged relative to the log transfer device. Based upon the distances between the sensors and the time measurements of the log to pass from one sensor to the next sensor, log rolling velocities and acceleration may be determined. Applying the rolling log's velocity and acceleration, the time at which the log will be at positions on the log transfer device and at the bucket infeed may be determined. Based on the time for the log to move from the entrance of the log transfer device to the bucket infeed, the continuous loop of the accumulator may be driven such that a bucket in the plurality of buckets of the accumulator is positioned at the bucket infeed with sufficient time to allow the bucket to receive the log from the log transfer device.

The dynamics of the log rolling on the log transfer device, including its velocity and acceleration, may be influenced by the log's wound characteristics and the upstream equipment. For instance, the initial velocity of the log as the log enters the entrance of the log transfer device and as the log exits the tail seal unit may be affected by the tail seal unit settings and its set-up. With the method described herein, each log on the log transfer device may be evaluated at each sensor even with multiple logs rolling on the log transfer device. With data compiled by the sensors for each log, the time in transit for the next in series log to move from the entrance of the log transfer device to the bucket infeed may be determined, and via the control system, the accumulator may be operated to accommodate the arrival of the next in series log.

Other advantages and implementations of the principles of the disclosure will become evident from the description that follows.

DESCRIPTION OF THE DRAWINGS

FIG. 2 shows a log transfer device.

FIG. 3 is an enlarged view of the bucket infeed of the accumulator taken from detail area 3-3 of FIG. 1.

FIG. 4 is an enlarged view of the bucket infeed of the accumulator taken from detail area 4-4 of FIG. 3 and in particular showing cushioning elements or energy dissipation members at the bucket infeed of the accumulator.

FIG. 5-1 is a process flow diagram for determining an arrival time of a log at the bucket infeed of the accumulator and sequencing a bucket to arrive at the bucket infeed with sufficient time to allow the bucket to receive the log from the log transfer device.

FIG. 5-2 is a continuation of the process flow diagram from FIG. 5-1.

FIG. 5-3 is a continuation of the process flow diagram from FIG. 5-2.

FIG. 5-4 is a continuation of the process flow diagram from FIG. 5-3.

FIG. 5-5 is a continuation of the process flow diagram from FIG. 5-3.

DETAILED DESCRIPTION

Figure 1:
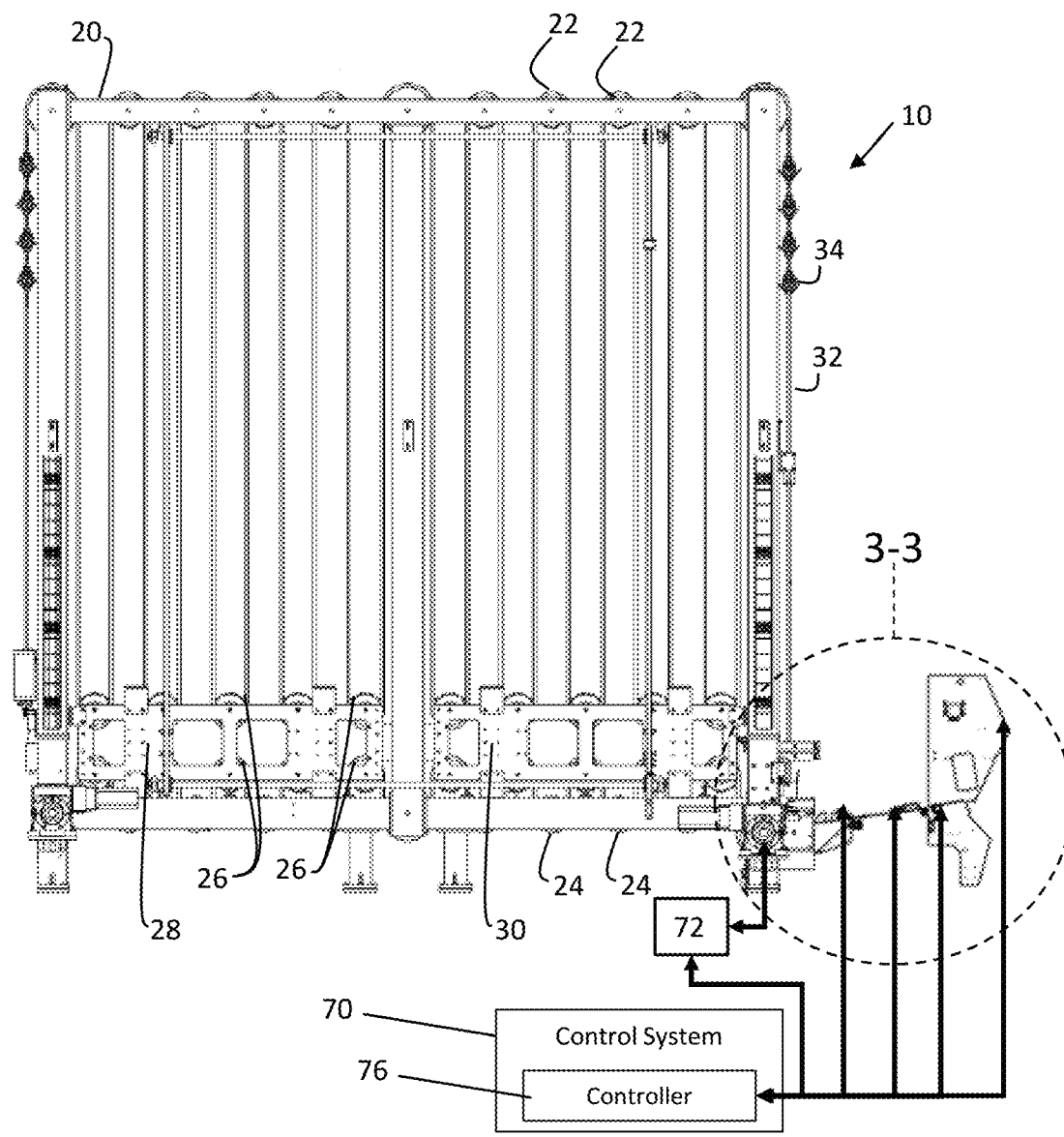
FIGS. 1-4 shows an accumulator with a log transfer device extending between a bucket infeed of the accumulator and upstream processing equipment.
Figure 2:
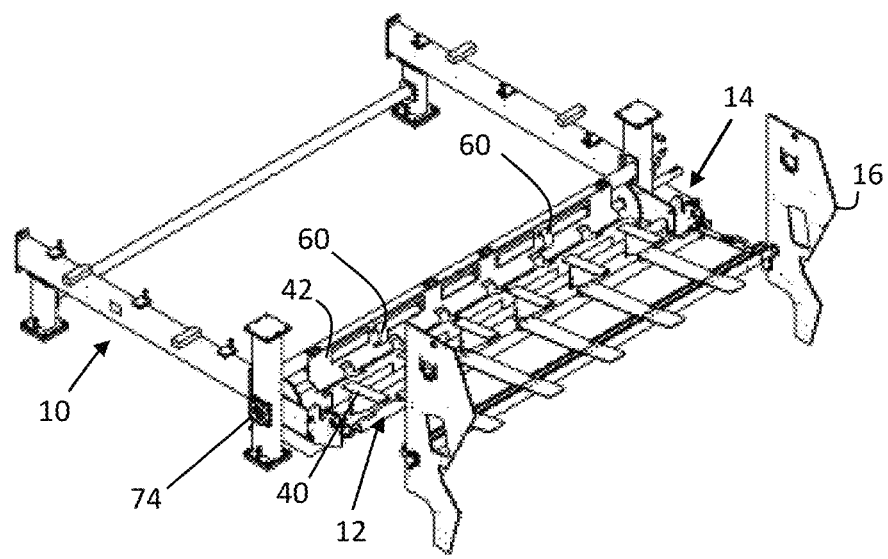
Figure 3:
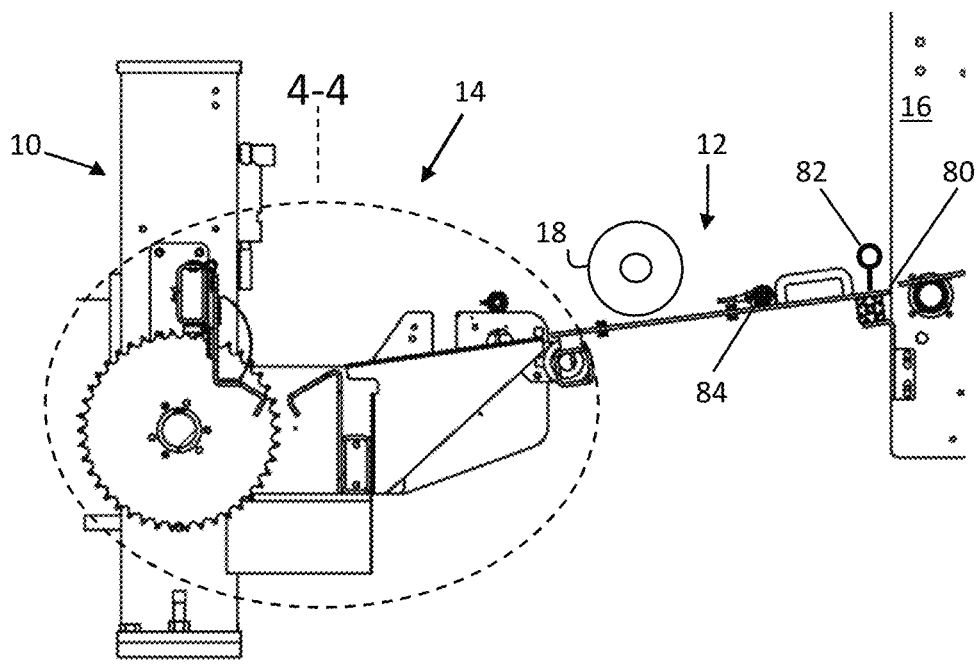

FIGS. 1-4 show an accumulator 10 with a log transfer device 12 extending between a bucket infeed 14 of the accumulator and upstream processing equipment 16 which by way of example in the description that follows is a tail seal unit. A log 18 may move from the rewinder, pass through the tail seal unit, and on to the log transfer device 12 to the bucket infeed 14 of the accumulator.

The accumulator 10 has a frame 20. Top guide wheels 22 are arranged adjacent a top member of the frame and bottom guide wheels 24 are arranged adjacent to a bottom member of the frame. Intermediate guide wheels 26 are provided on first and second carriages 28,30 that are vertically movable between uprights of the frame 20 between the top and bottom members of the frame. In the alternative, a single carriage may be provided. A continuous loop 32 extends around the guide wheels. The continuous loop 32 has a plurality of buckets 34 with a generally v-shaped cross-section for supporting the logs 18 as they are received at the bucket infeed 14. The generally v-shaped cross-section of the bucket 34 for supporting the logs may have the form of fingers intermittently spaced along an axis of the bucket. In some embodiments, the generally v-shaped cross section of the bucket may be substantially continuous across the width of the bucket. In the drawings, only some of the buckets are shown for ease of illustration. The buckets may be evenly spaced along the continuous loop. The buckets are pivotally connected to the continuous loop so as to allow the logs to be conveyed in the accumulator around the guide wheels and to allow the buckets to pivot as necessary to receive a log at the bucket infeed.

Figure 4:
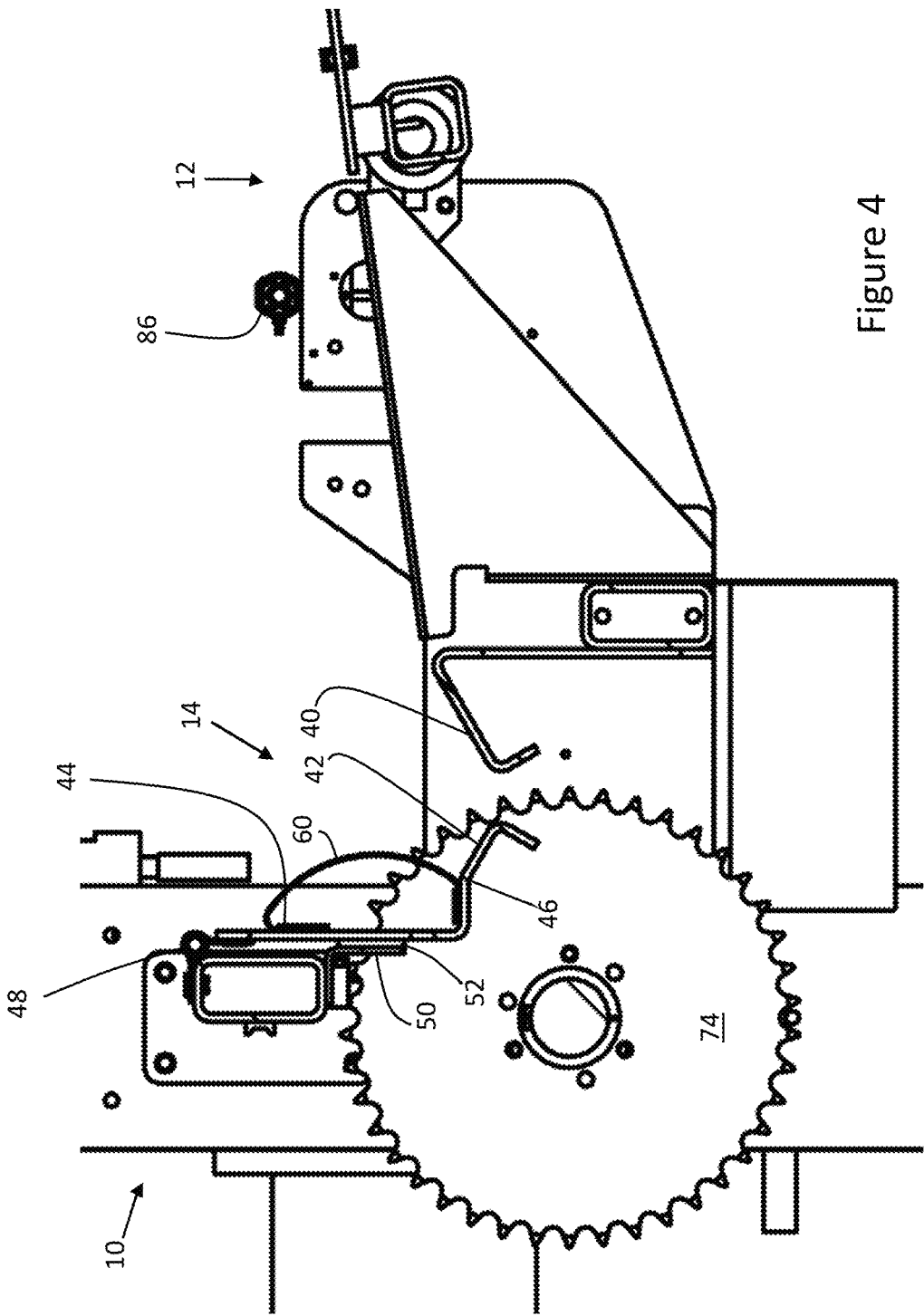
Figures 1, 5:
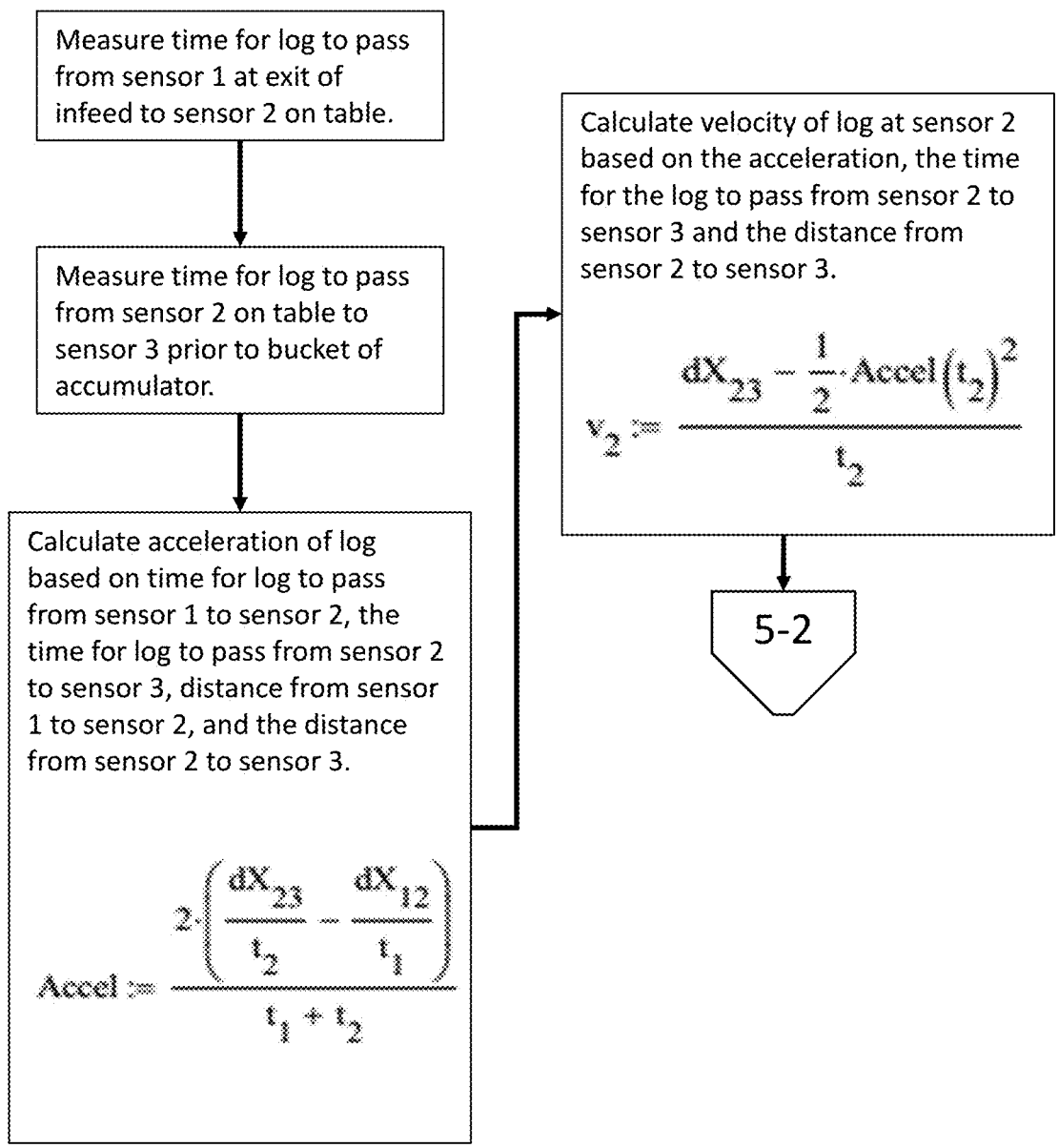
Figures 2, 5:
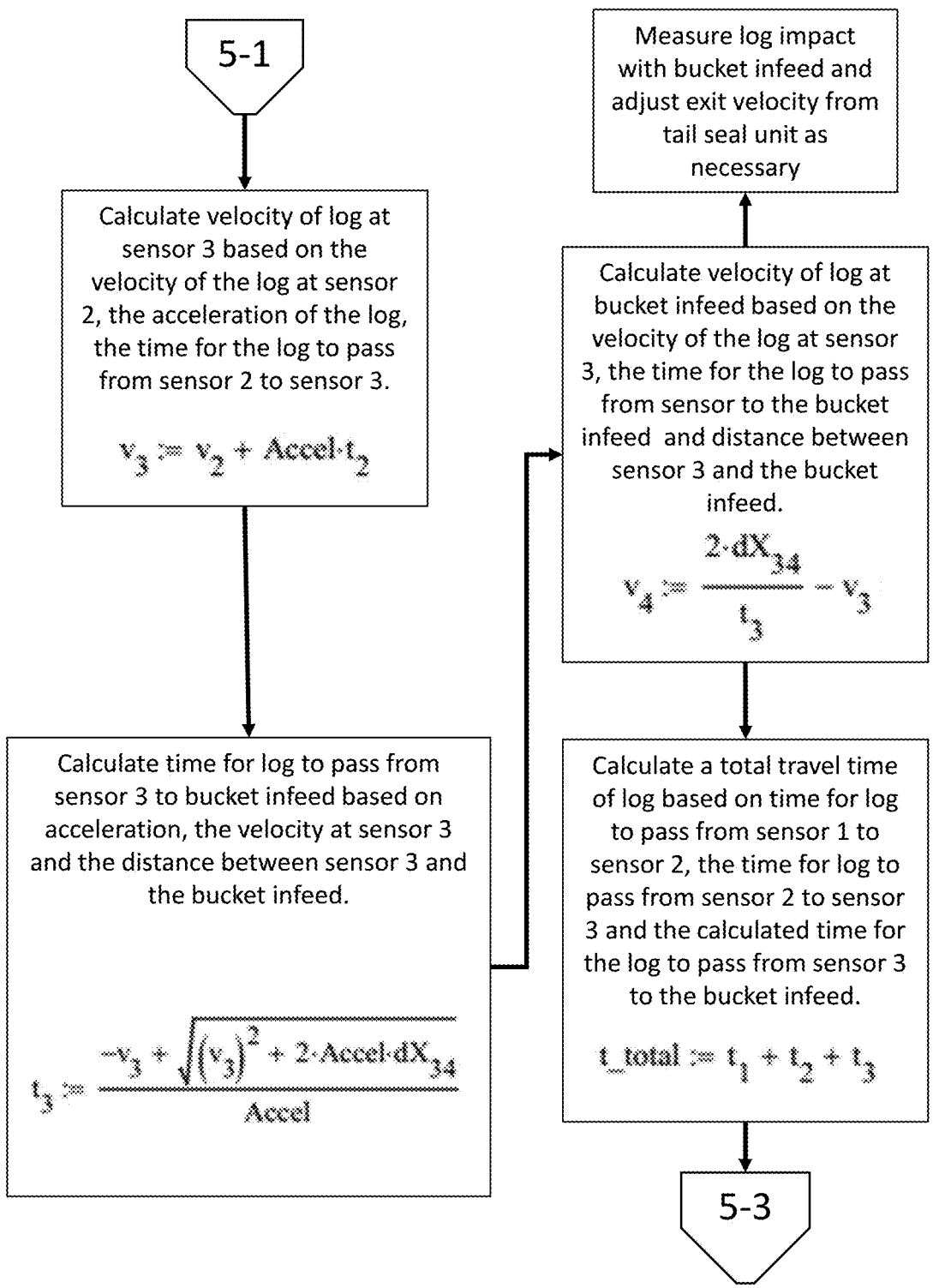
Figures 4, 5:
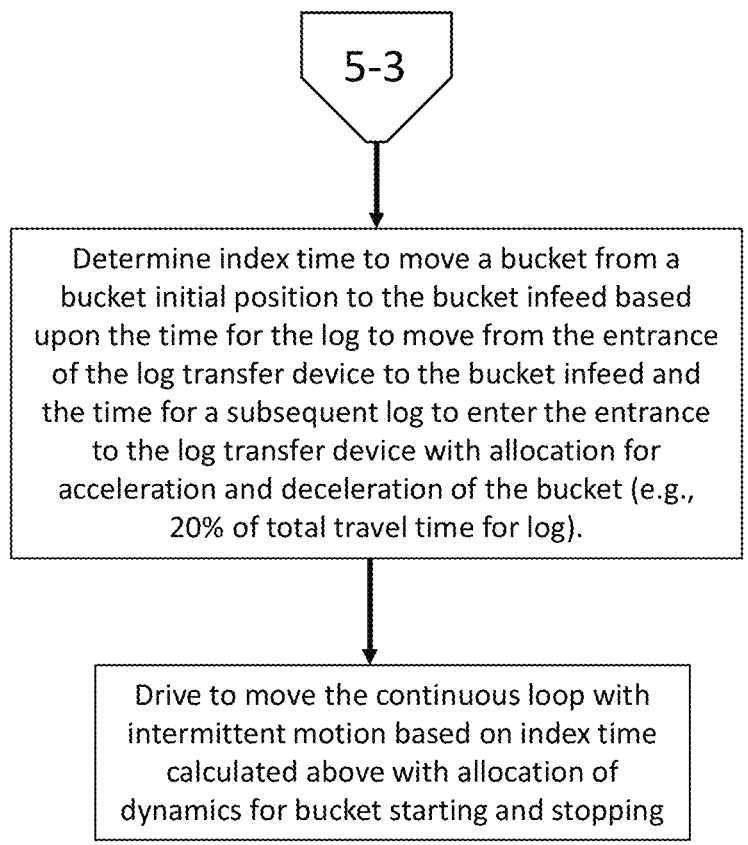
Figure 5:
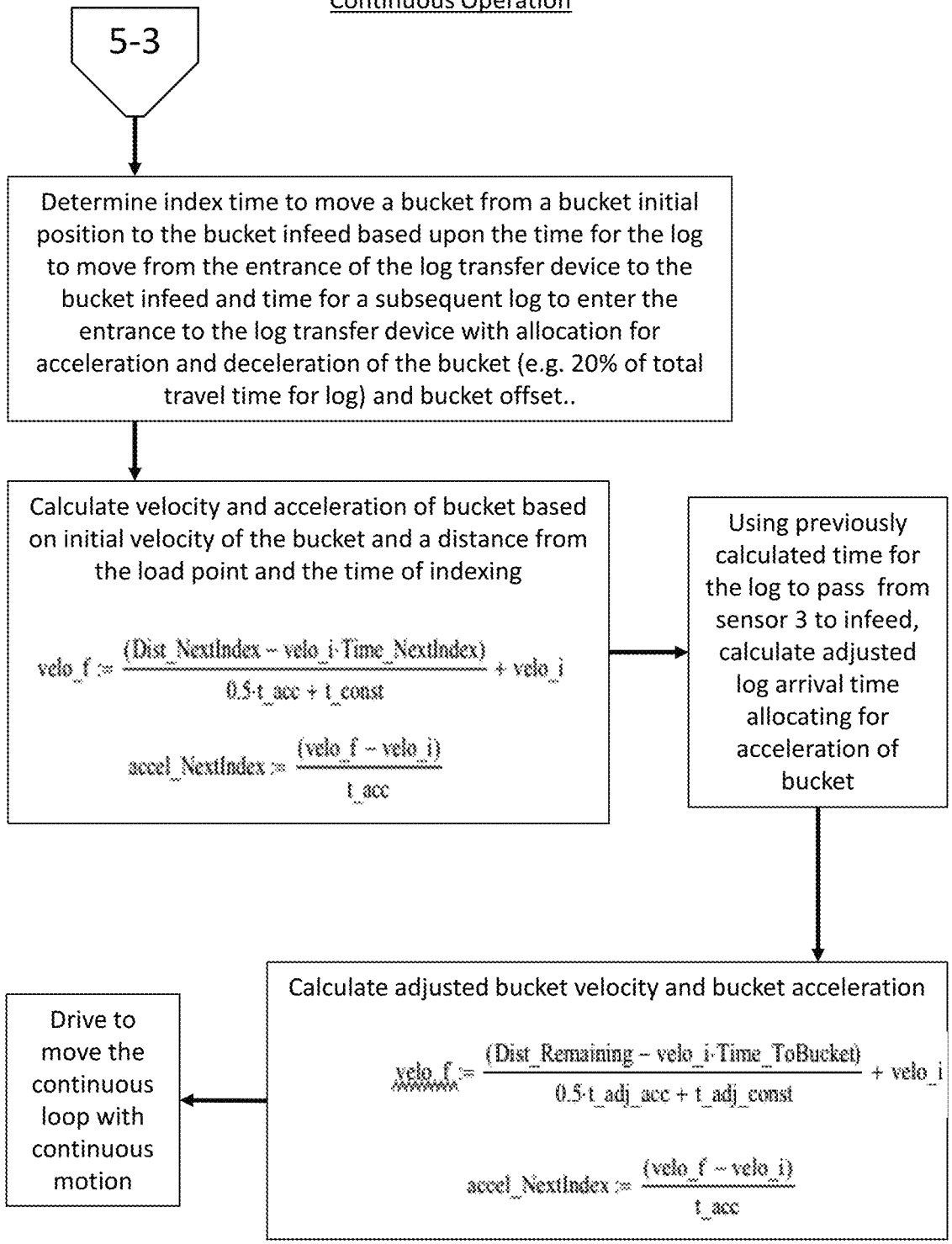

The bucket infeed 14 is adapted and configured to receive the log 18 from the log 12 transfer device into one of the buckets 34. The bucket infeed 14 may comprise a plurality of fingers 40,42 that are arranged to form a trough like structure across the frame 20 of the accumulator. There may be a set of trailing fingers 40 and a set of leading fingers 42 that together form a tough like structure of the bucket infeed 14 of the accumulator. The plurality of fingers 40,42 may be interdigitated with the fingers on the bucket so as to allow the bucket to pass through the plurality of fingers 40,42 of the bucket infeed 14 and receive the log 18 when the log is positioned on the fingers of the bucket infeed. As best shown in FIG. 4, the leading fingers 42 may have a general "L"-shape with an upright region 44 and an angled region 46. The angled region 46 may be arranged to support a majority of the weight of the log 18 in the bucket infeed 14. The vertical region is configured to allow the leading finger 42 to be attached to the frame 20 of the accumulator 10. A top end of the vertical region 44 may have a pivot connection 48 with the frame to allow the leading finger to move (clockwise in FIG. 4) when impacted by a log thereby dissipating energy of the log. A stop 50 may be provided on the frame 20 to limit the pivoting motion of the leading finger 42. The stop 50 may include a resilient member 52 to assist in dissipating the energy of the log after impact with the leading finger 42. An intermediate area of the vertical region 44 may contact the stop 50. As the leading finger 42 receives the log 18, the vertical region 44 may pivot (e.g., clockwise in FIG. 4) against the stop 50 and compress the resilient member 52. Additionally or optionally, the bucket infeed 14 may include a bumper 60 to absorb the impact of the log entering the bucket infeed and to limit the vertical motion of the log as it enters the bucket infeed. In another embodiment, the plurality of fingers 40,42 may be omitted and a log may be loaded directly into a bucket. In this embodiment, the continuous loop 32 may move either up or down as it moves through the bucket infeed 14. In this embodiment, the buckets may be of the type in which the generally v-shaped cross section of the bucket is substantially continuous across the width of the bucket.

While the description herein is directed to the infeed of accumulator, it should be appreciated that the principles described herein may be applied equally to any log transfer device that enables a log to be transferred to a bucket style accumulator or loader. For instance, in US 20210047140 (application Ser. No. 16/987,495), a transfer system is described which includes a main accumulator for storing logs, one or more loaders which transfer logs to conveyors for conveying the logs to downstream processing equipment, and transfer conveyors for transferring logs between the accumulator and the one or more loaders. The concepts disclosed herein may be applied to such transfer conveyors as well as the infeed to the main accumulator. Some concepts disclosed herein may be applied to transfer conveyors between other processing equipment, for example between a rewinder and a tail seal unit, or between a tail seal unit and a coreless mandrel extractor.

While the log transfer device 12 may be an inclined table or roll-down style ramp, the log transfer device may comprise conveyors with one or more belts for transporting the logs on the conveyor. For instance, the log transfer device may comprise a series of flat belts for the logs to roll on that run opposite to the log's rolling direction. The belts may be operated to reduce the rolling velocity of the log as the log transitions from the upstream processing equipment to the bucket infeed of the accumulator. The belts may be interspersed with the fixed sections of the inclined table.

As will be described in greater detail below the speed of the continuous loop 32 may be controlled via a control system 70 as needed to enable the transfer of the log from the bucket infeed 14 to the bucket 34 with a seamless transition. To control the speed and timing of the continuous loop 32 of the accumulator, a drive 72 that interfaces with a transmission system 74 of the accumulator may be provided. The drive 72 may be configured to communicate with a controller 76 of a control system for the processing line and/or the accumulator. The controller 76 interfaces with the drive 72 of the accumulator to move the continuous loop 32 of the accumulator and the buckets 34 based upon the transit time of the log on the log transfer device. The controller 76 has a processor and a memory. The controller 76 is programmed in a manner that enables the controller to determine the time for the log 18 to move from the entrance 80 of the log transfer device 12 to the bucket infeed 14. Based on the determined time, the controller 76 controls the accumulator drive 72 to move the continuous loop such that the next available bucket 34 is positioned at the bucket infeed 14 with sufficient time to receive the log from the log transfer device 12.

The log transfer device 12 may be arranged with sensors 82,84,86 that sense the position of the log 18 on the log transfer device. The sensors 82,84,86 may be arranged on the log transfer device or at a position not physically situated on the log transfer device but with sufficient proximity to sense the position of the log on the log transfer device. The controller 76 may be adapted and configured to receive signals from the sensors 82,84,86 on the log transfer device. The signals from the sensors on the log transfer device may be representative of the time it takes for a log to pass from one sensor to a subsequent sensor. The controller 76 may also be programmed with data representative of distances between the sensors 82,84,86 on the log transfer device 12. The controller may be enabled to determine the time for the log to pass from a sensor to a subsequent sensor, and thereafter the acceleration and velocity of the log at different points on the log transfer device.

In one configuration, three sensors may be provided. More or fewer sensors may be provided: for example, a positive log release mechanism may be provided in place of a sensor. A first sensor 82 may be arranged to sense the presence of a log at the press/position rolls of the tail seal unit or at the entrance to the log transfer device 80, a second sensor 84 may be arranged to sense the presence of a log at an intermediate region of the log transfer device, and a third sensor 86 may be arranged to sense the presence of a log just prior to the bucket infeed. With the three sensors at known distances apart providing signals representative of a log passing by the respective sensor, the controller 76 can determine the time that it takes for the log to roll from sensor to sensor. Assuming the log undergoes constant acceleration, the controller can determine the time that the log will arrive at a distance further down the table, for instance, at the bucket infeed 14. In one aspect, the controller 76 is adapted and configured for determining an acceleration of the log on the log transfer device based on the sensor distances and the respective times for the log to pass from one sensor to the subsequent sensor on the log transfer device. For instance, controller 76 may determine the acceleration of the log using programming around the following equation:

$$Accel := \frac{2 \cdot \left( \frac{dX_{23}}{t_2} - \frac{dX_{12}}{t_1} \right)}{t_1 + t_2}$$

The velocity of the log can then be calculated at any point. For instance, controller 76 may determine the velocity of the log as it leaves the tail seal unit or the entrance of the log transfer device using programming around the equation:

$$v_1 := \frac{dX_{12} - \frac{1}{2} \cdot Accel \cdot (t_1)^2}{t_1}$$

The controller 76 may determine the velocity of the log as it leaves and passes the second sensor 84 in the intermediate region of the log transfer device using programming around the equation:

$$v_2 := \frac{dX_{23} - \frac{1}{2} \cdot Accel(t_2)^2}{t_2}$$

The controller 76 may determine the velocity of the log as it passes the third sensor 86 just prior to the log entering the bucket infeed 14 using programming around the equation:

$$v_3 := v_2 + Accel \cdot t_2$$

For a known distance further down the log transfer device from the third detector, for instance, the bucket infeed 14, the controller 76 may determine the time for the log to reach that position using programming around the equation:

$$t_3 := \frac{-v_3 + \sqrt{(v_3)^2 + 2 \cdot Accel \cdot dX_{34}}}{Accel}$$

The controller 76 may determine the velocity of the log as it enters the bucket infeed 14 using programming around the equation:

$$v_4 := \frac{2 \cdot dX_{34}}{t_3} - v_3$$

The velocity of the log entering the bucket infeed may be useful to determine the impact of the log in the bucket feed 14 and whether discharge of the log from the upstream processing equipment, for instance, the tail seal unit 16, should be changed. An excessive velocity at the bucket infeed 14 may cause damage to the log or excessive vertical motion of the log which might create problems for loading of the log in the bucket 34. Accordingly, the controller may be adapted and configured for determining a velocity of the log entering the bucket infeed based on the determined acceleration, the sensor distances, and the respective times for the log to pass from one sensor to the subsequent sensor on the log transfer device.

The controller 76 may then determine the total time for the log to transit across the log transfer device using programming around the equation:

$$t\_total := t_1 + t_2 + t_3$$

The controller 76 may be further enabled to determine a log cycle time based on the total time for the log to transit across the log transfer device (i.e., from the entrance of the log transfer device 80 to the bucket infeed 14) and the time it takes for a log to appear at the entrance of the log transfer device, for instance, at the discharge of the tail seal unit.

The controller 76 may also be enabled to synchronize movement of the accumulator so that the next available empty bucket 34 will be at the loading position at the bucket infeed 14 as the new log arrives 18 at the bucket infeed. The controller may be enabled to send signals to the drive 72 of the accumulator based on several factors including the time for the next available empty bucket to move from an initial position of the bucket to the bucket infeed 14 with allocation for bucket acceleration, bucket deceleration, bucket initial velocity, bucket dwell time at the bucket infeed, and bucket maximum safe operating velocity. Several of the factors are dependent upon the geometry and size of the buckets on the accumulator, which may be influenced by log diameter size and material.

The controller 76 may be enabled to determine a bucket cycle time based upon the time for a bucket to move from a bucket initial position to the bucket infeed with allocation for bucket acceleration, bucket deceleration, bucket initial velocity, bucket dwell time at the bucket infeed, and bucket maximum safe operating velocity. The bucket dwell time may allow for log settling. In one aspect, the controller 76 may be enabled to send signals to the drive 72 of the accumulator to move the continuous loop 32 with intermittent motion when the log cycle time is greater than the bucket cycle time; and send signals to the drive of the accumulator to move the continuous loop with continuous motion when the log cycle time is less than the bucket cycle time. For instance, if the log cycle time is 3 seconds (i.e., a log enters and crosses the log transfer device in 3 seconds) and the bucket cycle time is 0.4 seconds, the controller may send signals to the drive to operate the continuous loop in the intermittent mode. In one aspect, the controller 76 may be enabled to send signals to the drive 72 of the accumulator to move the continuous loop with intermittent motion when only one log is present on the inclined table of the log transfer device; and send signals to the drive of the accumulator to move the continuous loop with continuous motion when more than one log is present on the inclined table of the log transfer device. In one example, the transition between intermittent motion and continuous motion occurs at a log cycle time 2.4 seconds (a log cycle rate of around 25 logs per minute). In the intermittent motion mode, each subsequent bucket may arrive and stop at a bucket start position which is approximately coincident with the loading position, and wait there until a log arrives at the loading position. In the continuous motion mode, each subsequent bucket may arrive in motion at a bucket position (a bucket offset) that is slightly lower (lower in the drawings) than the bucket infeed to accommodate log settling time as the energy of the rolling log dissipates. The bucket continues in motion through the loading position at the bucket infeed to load the log into the bucket. If the bucket position at log arrival for continuous motion is slightly lower than the loading position, this distance must be accounted for in the transition between intermittent motion and continuous motion: that is, in the transition from intermittent to continuous motion, the distance the next bucket must travel is decreased by this distance, while in the transition from continuous motion to intermittent motion, the distance the next bucket must travel is increased by this distance. In the continuous mode, the controller 76 may be adapted and configured to determine the bucket initial position based on a bucket start position and any bucket position offset, and send corresponding signals to the drive 72.

In both the intermittent motion and continuous motion modes, the controller 76 may be enabled to send signals to the drive 72 of the accumulator to move the continuous loop 32 such that an index time to move a bucket from a bucket initial position to the bucket infeed is based upon the time for the log 18 to move from the entrance of the log transfer device 80 to the bucket infeed 14 with allocation for acceleration and deceleration of the bucket and allocation of time for a subsequent log to enter the entrance to the log transfer device 80. In the continuous motion mode, allocation for acceleration and deceleration of the bucket and allocation of time for a subsequent log to enter the entrance to the log transfer device allows for the controller to send signals to the drive to change speed of the continuous loop based upon changes in log cycle time. In one aspect, the allocation for acceleration and deceleration of the bucket may be 20% of total log transit time and may also include system sensor scan and processing time lapse. The controller 76 may also be adapted and configured to determine an index velocity of the bucket based on the index distance, the index time, and an initial velocity of the bucket. For instance, the controller 76 may be enabled to determine velocity and acceleration of the bucket with programming based on the following equations:

$$\text{velo\_f} := \frac{(\text{Dist\_NextIndex} - \text{velo\_i} \cdot \text{Time\_NextIndex})}{0.5 \cdot \text{t\_acc} + \text{t\_const}} + \text{velo\_i}$$

$$\text{accel\_NextIndex} := \frac{(\text{velo\_f} - \text{velo\_i})}{\text{t\_acc}}$$

and send corresponding signals to the drive 72.

When transitioning from continuous motion to intermittent motion, the controller 76 may be enabled to determine a stop distance based upon a dimension of the bucket, and determine a bucket index stop time with allocation for acceleration and deceleration of the bucket, and send corresponding signals to the drive 72. If a log is loaded into the bucket of the accumulator and a subsequent log is not coming from the upstream processing equipment, i.e., the tail seal unit, then the next index of the bucket may include a deceleration to zero final velocity and a dwell back to the starting position taking into account any bucket position offset. The time allowed for the index to come to a stop may be constant and may be set such that the motion dynamics in the accumulator are reasonable, for instance, minimize bucket swing while allowing the bucket infeed to be ready to receive another bucket and another log from the upstream processing equipment. If the bucket needs to change velocity from a previous index to an index that will carry the bucket to a stop, then a change in velocity (i.e., a non-zero acceleration) may be necessary. The controller may be enabled to calculate a final deceleration to bring the bucket from the stopping velocity to zero velocity and send corresponding signals to the drive 72.

In a continuous motion mode, as the log 18 is rolling down to the bucket infeed 14 of the accumulator, the controller 76 may be programmed to determine log acceleration and velocity as discussed above. When the log passes the third sensor 86, the controller 76 may be enabled to determine the position and velocity of the bucket carrying away the previous log and the position of the next available empty bucket relative to the load point, and send corresponding signals to the drive 72 to adjust the bucket velocity based on the estimated time that the next log will arrive at the bucket infeed. If the next available empty bucket is moving too slowly (i.e., the log will arrive early), the next available empty bucket must accelerate. If the next available empty bucket is moving too fast (i.e., the log will arrive late, potentially hitting the side of a bucket), the next available empty bucket must decelerate to properly meet the log at the load point. To keep peak velocity low, the controller 76 may be enabled to allocate half of the time for the log to reach the bucket infeed for accelerating the bucket. The velocity of the bucket may be determined from data from the drive 72 of the accumulator. The controller 76 may then be enabled to determine a new velocity given the distance the bucket needs to travel to reach the load point by the time that the next log will arrive at the bucket infeed with a given bucket offset, and send corresponding signals to the drive 72. The controller may be enabled to determine bucket acceleration and bucket velocity based on programming around the equations:

$$\text{velo\_f} := \frac{(\text{Dist\_Remaining} - \text{velo\_i} \cdot \text{Time\_ToBucket})}{0.5 \cdot \text{t\_adj\_acc} + \text{t\_adj\_const}} + \text{velo\_i}$$

$$\text{accel\_NextIndex} := \frac{(\text{velo\_f} - \text{velo\_i})}{\text{t\_acc}}$$

and send corresponding signals to the drive 72.

Further embodiments can be envisioned by one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, various modifications and changes may be made thereunto without departing from the broader spirit and scope of the invention as set forth in the claims and that the invention is intended to cover all modifications and equivalents within the scope of the following claims.

What is claimed is:

1. A method for controlling motion of an accumulator with a control system, wherein the control system has a controller, the accumulator has a plurality of buckets on a continuous loop, the continuous loop is driven by a drive, the drive is in communication with the controller, the controller is adapted and configured for controlling motion of the continuous loop through the drive, each bucket of the plurality of buckets of the accumulator is adapted and configured to receive, hold and release a log, the accumulator has a log transfer device, the log transfer device is adapted and configured to roll a log from an entrance of the log transfer device to a bucket infeed on the accumulator, the bucket infeed is adapted and configured to receive a log from the log transfer device and allow a bucket of the plurality of buckets to receive the log from the log transfer device, the method comprising:

with at least one sensor in communication with the controller, determining a time for the log to roll from the entrance of the log transfer device to the bucket infeed; and based on the time for the log to roll from the entrance of the log transfer device to the bucket infeed, enabling the controller to control the accumulator drive to move the continuous loop such that a bucket in the plurality of buckets is positioned at the bucket infeed with sufficient time to allow the bucket to receive the log from the log transfer device.

2. The method of claim 1 wherein the step of determining the time for the log to roll from the entrance of the log transfer device to the bucket infeed includes:

providing sensors at distances on the log transfer device;

configuring the sensors to sense movement of the log on the log transfer device, generate signals representative of the movement of the log on the log transfer device, and transmit the signals to the controller; and based on the generated signals, enabling the controller to determine the time for the log to pass from a sensor to a subsequent sensor.

3. The method of claim 1 wherein the step of determining the time for the log to roll from the entrance of the log transfer device to the bucket infeed includes determining an acceleration of the log on the log transfer device based on the sensor distances and the respective times for the log to pass from the sensor to the subsequent sensor on the log transfer device.

4. The method of claim 3 wherein the step of determining the time for the log to roll from the entrance of the log transfer device to the bucket infeed includes determining a velocity of the log entering the bucket infeed based on the acceleration, the sensor distances, and the respective times for the log to pass from the sensor to the subsequent sensor on the log transfer device.

5. The method of claim 1 further comprising enabling the controller to send signals to the drive of the accumulator to move the continuous loop with at least one of an intermittent motion and a continuous motion.

6. A method for controlling motion of an accumulator with a control system, wherein the control system has a controller, the accumulator has a plurality of buckets on a continuous loop, the continuous loop is driven by a drive, the drive is in communication with the controller, the controller is adapted and configured for controlling motion of the continuous loop through the drive, each bucket of the plurality of buckets of the accumulator is adapted and configured to receive, hold and release a log, the accumulator has a log transfer device, the log transfer device is adapted and configured to deliver a log from an entrance of the log transfer device to a bucket infeed on the accumulator, the bucket infeed is adapted and configured to receive a log from the log transfer device and allow a bucket of the plurality of buckets to receive the log from the log transfer device, the method comprising:

with at least one sensor in communication with the controller, determining a time for the log to move from the entrance of the log transfer device to the bucket infeed; and based on the time for the log to move from the entrance of the log transfer device to the bucket infeed, enabling the controller to control the accumulator drive to move the continuous loop such that a bucket in the plurality of buckets is positioned at the bucket infeed with sufficient time to allow the bucket to receive the log from the log transfer device; and further comprising:

with the controller enabled for a continuous motion operation of the continuous loop, with the controller determining an index time to move a bucket in the plurality of buckets from a bucket initial position to the bucket infeed based upon the time for the log to move from the entrance of the log transfer device to the bucket infeed with allocation for acceleration and deceleration of the bucket and with allocation of time for a subsequent log entering the entrance to the log transfer device; and enabling the controller to send signals to the drive based upon the index time.

7. The method of claim 6 further comprising determining the bucket initial position based on a bucket start position and a bucket position offset.

8. The method of claim 1, further comprising:

providing at least three sensors on the log transfer device, a first sensor being provided at the entrance of the log transfer device, the third sensor being provided prior to the bucket infeed, and the second sensor being between the first sensor and the third sensor, each of the sensors being adapted and configured to send a signal to the controller when the log passes the sensor; and determining (i) a first sensor time for the log to roll on the log transfer device from the first sensor to the second sensor; (ii) a second sensor time for the log to roll on the log transfer device from the second sensor to the third sensor; and (iii) an acceleration of the log on the log transfer device based on a first distance between the first sensor and the second sensor, a second distance between the second sensor and the third sensor, and the first sensor time and the second sensor time.

9. The method of claim 8 further comprising:

determining a velocity of the log at the second sensor based on the acceleration of the log, the second sensor time, and the distance between the second and third sensors.

10. The method of claim 9 further comprising:

determining a velocity of the log at the third sensor based on the velocity of the log at the second sensor, the acceleration of the log, and the second sensor time.

11. The method of claim 10 further comprising:

determining a third sensor time corresponding to a time for the log to pass from the third sensor to the bucket infeed based upon the determined velocity of the log at the third sensor, the acceleration of the log, and the distance between the third sensor and the bucket infeed.

12. The method of claim 11 further comprising:
determining a velocity of the log at the bucket infeed based upon the third sensor time, the distance between the third sensor and the bucket infeed, and the third sensor time.

13. The method of claim 12, further comprising:
enabling the controller to control machinery upstream of the log transfer device based on the determined velocity of the log at the bucket infeed.

14. The method of claim 11, wherein the step of enabling the controller to control the accumulator drive to move the continuous loop such that the bucket is positioned at the bucket infeed with sufficient time to receive a log from the log transfer device includes:
enabling the controller to send signals to the drive of the accumulator to move the continuous loop based upon the third sensor time, a distance of the bucket from the bucket infeed, a velocity of the bucket and an acceleration of the bucket.

15. The method of claim 11, wherein the time for the log to roll from the entrance of the log transfer device to the bucket infeed is based upon the first sensor time, the second sensor time, and the third sensor time.

16. A method for controlling motion of an accumulator with a control system, wherein the control system has a controller, the accumulator has a plurality of buckets on a continuous loop, the continuous loop is driven by a drive, the drive is in communication with the controller, the controller is adapted and configured for controlling motion of the continuous loop through the drive, each bucket of the plurality of buckets of the accumulator is adapted and configured to receive, hold and release a log, the accumulator has a log transfer device, the log transfer device is adapted and configured to deliver a log from an entrance of the log transfer device to a bucket infeed on the accumulator, the bucket infeed is adapted and configured to receive a log from the log transfer device and allow a bucket of the plurality of buckets to receive the log from the log transfer device, the method comprising:
with at least one sensor in communication with the controller, determining a time for the log to move from the entrance of the log transfer device to the bucket infeed; and
based on the time for the log to roll from the entrance of the log transfer device to the bucket infeed, enabling the controller to control the accumulator drive to move the continuous loop such that a bucket in the plurality of buckets is positioned at the bucket infeed with sufficient time to allow the bucket to receive the log from the log transfer device; and
with the controller enabled for intermittent operation of the continuous loop, determining a next index time to move a bucket in the plurality of buckets from a bucket initial position to the bucket infeed based upon time for the log to move from the entrance to the log transfer device to the bucket infeed with allocation of time for a subsequent log to enter the entrance of the log transfer device, dwell time at the bucket infeed, and with allocation for acceleration and deceleration of a bucket in the plurality of buckets.

17. The method of claim 16 further comprising:
determining an index distance based upon a bucket initial position and the bucket infeed position.

18. The method of claim 17 further comprising:
determining an index velocity of the bucket based on the index distance, the next index time, and an initial velocity of the bucket.

19. The method of claim 18 further comprising:
determining a bucket acceleration based upon the bucket index velocity.

20. The method of claim 19 further comprising:
determining a stop distance based upon a dimension of the bucket.

21. The method of claim 20, further comprising:
determining a bucket index stop time with allocation for acceleration and deceleration of the bucket.

22. A method for controlling motion of an accumulator with a control system, wherein the control system has a controller, the accumulator has a plurality of buckets on a continuous loop, the continuous loop is driven by a drive, the drive is in communication with the controller, the controller is adapted and configured for controlling motion of the continuous loop through the drive, each bucket of the plurality of buckets of the accumulator is adapted and configured to receive, hold and release a log, the accumulator has a log transfer device, the log transfer device is adapted and configured to deliver a log from an entrance of the log transfer device to a bucket infeed on the accumulator, the bucket infeed is adapted and configured to receive a log from the log transfer device and allow a bucket of the plurality of buckets to receive the log from the log transfer device, the method comprising:
with at least one sensor in communication with the controller, determining a time for the log to move from the entrance of the log transfer device to the bucket infeed; and
based on the time for the log to roll from the entrance of the log transfer device to the bucket infeed, enabling the controller to control the accumulator drive to move the continuous loop such that a bucket in the plurality of buckets is positioned at the bucket infeed with sufficient time to allow the bucket to receive the log from the log transfer device; and
enabling the controller to send signals to the drive of the accumulator to move the continuous loop with at least one of an intermittent motion and a continuous motion based upon a comparison of a log cycle time with a bucket cycle time, wherein the log cycle time is based upon the time for the log to move from the entrance of the log transfer device to the bucket infeed and a time for a subsequent log to enter the entrance of the log transfer device, wherein the bucket cycle time is based upon the time for a bucket to move from a bucket initial position to the bucket infeed with allocation for bucket acceleration, bucket deceleration, bucket initial velocity, bucket dwell time at the bucket infeed, and bucket maximum safe operating velocity;
wherein the step of enabling the controller to send signals to the drive of the accumulator to move the continuous loop with the intermittent motion includes determining the log cycle time is greater than the bucket cycle time; and
wherein the step of enabling the controller to send signals to the drive of the accumulator to move the continuous loop with the continuous motion includes determining the log cycle time is less than the bucket cycle time.

* * * * *